(12) United States Patent
Alberternst et al.

(10) Patent No.: US 10,870,075 B2
(45) Date of Patent: Dec. 22, 2020

(54) HOUSING, IN PARTICULAR FILTER HOUSING AND AIR CONDITIONING SYSTEM FOR A VEHICLE

(71) Applicant: Hanon Systems, Daejeon (KR)

(72) Inventors: Thomas Alberternst, Aachen (DE); Jürgen Hoppen, Cologne (DE)

(73) Assignee: Hanon Systems, Daejeon (KR)

( * ) Notice: Subject to any disclaimer, the term of this patent is extended or adjusted under 35 U.S.C. 154(b) by 261 days.

(21) Appl. No.: 15/995,551

(22) Filed: Jun. 1, 2018

(65) Prior Publication Data

US 2018/0353890 A1    Dec. 13, 2018

(30) Foreign Application Priority Data

Jun. 7, 2017  (DE) .................. 10 2017 209 578

(51) Int. Cl.
*B01D 46/00* (2006.01)
*B01D 46/10* (2006.01)
*B01D 46/24* (2006.01)
*B60H 3/06* (2006.01)

(52) U.S. Cl.
CPC ..... *B01D 46/0006* (2013.01); *B01D 46/0002* (2013.01); *B01D 46/10* (2013.01); *B01D 46/2414* (2013.01); *B60H 3/0658* (2013.01); *B01D 2271/02* (2013.01); *B60H 2003/065* (2013.01)

(58) Field of Classification Search
CPC ............ B01D 46/0002; B01D 46/0006; B01D 46/0004; B01D 46/10; B01D 46/0005; B01D 46/2414; B60H 3/0658; B60H 2003/065

See application file for complete search history.

(56) References Cited

U.S. PATENT DOCUMENTS

2004/0194441 A1    10/2004  Kirsch
2016/0144311 A1*   5/2016  Suzuki ................... B01D 46/10
                                                                55/497

FOREIGN PATENT DOCUMENTS

| DE | 1786385 U | 4/1959 |
|---|---|---|
| DE | 1857821 U | 8/1962 |
| DE | 4004754 A1 | 9/1991 |
| DE | 19804452 A1 | 8/1998 |
| DE | 102009015097 A1 | 10/2010 |
| DE | 102016102574 B3 | 4/2017 |
| KR | 0167177 | 12/1998 |
| KR | 101141532 B1 | 5/2012 |

* cited by examiner

*Primary Examiner* — Robert Clemente
(74) *Attorney, Agent, or Firm* — Norton Rose Fulbright US LLP; James R. Crawford

(57) ABSTRACT

A housing for a motor vehicle comprises at least one opening and at least one cap which comprises a seal on an inner side such that the seal is disposed within the housing of the air-conditioning device when the cap caps the opening.

11 Claims, 2 Drawing Sheets

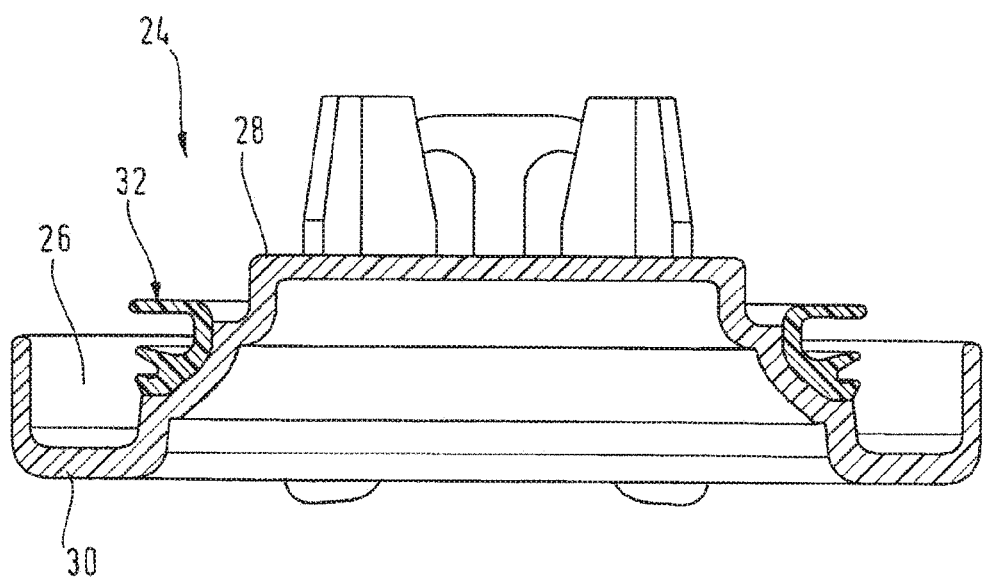
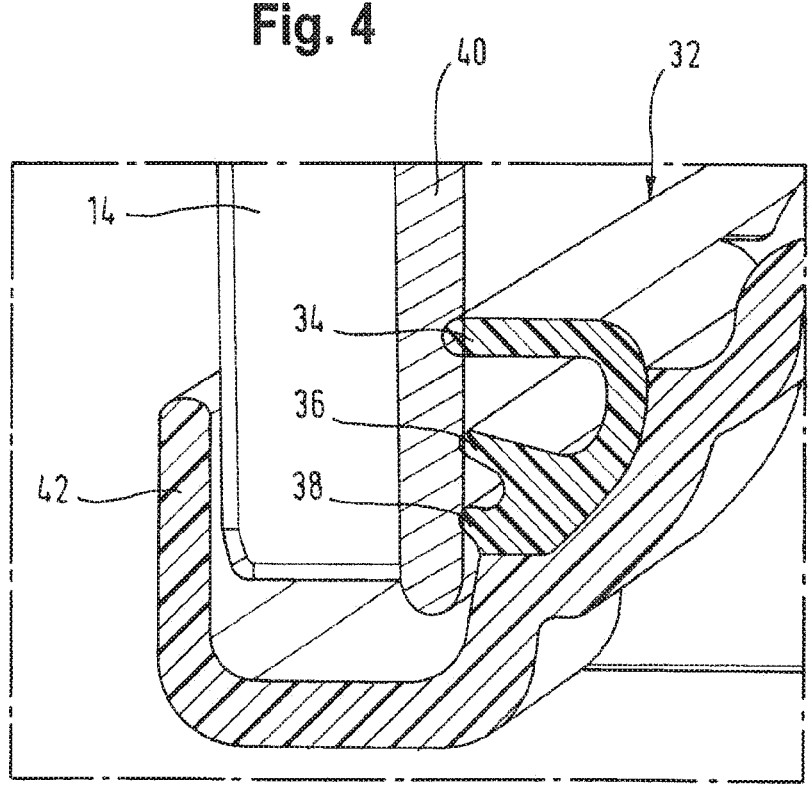

HOUSING, IN PARTICULAR FILTER HOUSING AND AIR CONDITIONING SYSTEM FOR A VEHICLE

This application claims priority under 35 USC § 119 from German Patent Application No. 102017209578.4 filed on Jun. 7, 2017, hereby incorporated in reference in its entirety for all purposes.

FIELD OF THE INVENTION

The invention relates to a housing, in particular a filter housing, and an air-conditioning system for a motor vehicle.

Air-conditioning systems of motor vehicles frequently comprise a pollen and/or odor filter that is disposed in a housing and needs to be replaced regularly. The appropriate housing typically includes for this purpose an opening through which the filter can be removed. The opening is closed by a cap which, for one, with respect to the housing, must be sealed tightly such that it withstands the pressure in the air-conditioning system that is comparatively higher than the ambient pressure. Depending on the location of this opening, the cap, for another, must ensure leak tightness against water occurring in the air-conditioning system.

PRIOR ART

Known in said field with adequate leak tightness against air and water are, for one, caps for filter housings that comprise a peripheral groove, oriented toward the filter housing, on their outer margin into which groove a seal is placed or foamed. When applying the cap, a circumferential edge of the filter housing is received in the groove such that the seal is at least minimally compressed and therewith fulfills its purpose. Since the seal is developed in an (axial) direction in which the cap is mounted on the filter housing, specifically in the direction of the opening of the described groove in which the circumferential edge of the filter housing is received, such seals are referred to as axial seals. Such seals, for one, have the disadvantage that, in order to raise the comparatively high forces required for their application, means for securing the cap on the filter housing are necessary that are distinct from the cap proper. Due to the described structure, further, water or moisture occurring in the filter housing are only at the seal prevented from penetrating out, with the seal being already located outside of the filter housing and specifically beyond the described circumferential edge.

This disadvantage applies equally to known, so-called, radial seals that function outside of the filter housing and, outside of the filter housing, act effectively from the outside laterally onto the described circumferential edge of the filter housing. Regarding such arrangements, there are also only known embodiments that require for their securement elements distinct from the cap proper.

DESCRIPTION OF THE INVENTION

Against this background the invention addresses the problem of providing a housing, in particular a filter housing, with a simply implemented cap which best meets the described requirements in view of leak tightness.

The problem is resolved, for one, through the housing described in Patent Claim 1.

Accordingly, this housing comprises at least one opening and at least one cap, that can also be referred to as a lid, which comprises at its inner side a seal such that the seal, after the cap has been placed into the opening and covers it, is preferably completely disposed within the housing. It should be emphasized in this context that the subject matter of the invention can be any housing, preferably that of an air-conditioning device. It is, however, preferred that through said opening, for example in the air inlet, in the evaporator housing or the like, a filter is accessible such that the housing according to the invention can be regarded to be a filter housing. In the following, consequently, the description refers to a filter housing even though it is understood that the invention relates to any housing.

By "within the filter housing" is to be understood that the opening edge of the filter housing typically defines a plane that separates the interior of the filter housing, in other words that side at which the filter housing is located, from the outer side of the filter housing where no region of the filter housing is located. In special application cases the opening edge of the filter housing may be on different planes which, however, can still be described as above. In the state in which the cap caps the opening of the filter housing, the seal is located according to the invention on that side of the described plane(s) that corresponds to the interior of the filter housing.

In the filter housing sealing can hereby be effectively ensured precisely at that site at which the increased pressure and/or moisture occurs. Thereby that a radial, specifically a seal effectively acting laterally from inside against the edge of the filter housing is involved, only minimal forces are required for securing the cap. It has in particular been found that separate securement elements can be omitted. Furthermore, those disadvantages are avoided that result from the fact that the comparatively small cap is subject to deformation over the course of its service life, which applies especially to its outer side. In contrast, the filter housing is comparatively permanently rigid and does not become deformed in its essential circumference as is also the case regarding the inner side of the cap such that the sealing is developed between said two, comparatively durably dimensionally-stable components and can ensure long-lasting sealing.

Thereby that the seal is provided on the cap, for one, an advantage is obtained to the effect that, should it become damaged, it can be more readily replaced than if the seal were provided on the housing. The filter housing, furthermore, typically has a more complex form than the cap such that any tools and molds that are required for the integration of the seal into the cap, are markedly less complex than if the seal were provided on the filter housing.

Preferred further developments of the filter housing according to the invention are described in the additional claims.

It is preferred that the seal is at least partially implemented of a thermoplastic elastomer. Such a comparatively elastic and flexible material can be deformed without any problem such that the seal in the emplaced state of the cap is reliably and durably in contact on the inner face of the filter housing in the proximity of the opening edge.

The above described advantages are in particular obtained if the seal therefore is at least implemented of a material that is softer than the material of the cap.

Special reliability and security of the sealing is obtained if the seal comprises at least one sealing lip, preferably two or more and, especially preferred, three sealing lips. At least one sealing lip extends at least largely in the radial direction, i.e. at least largely parallel to the above described plane defined by the opening edge.

Special advantages are obtained if at least one sealing lip is more readily deformable than at least one additional sealing lip. Stated differently, by being shaped longer and/or thinner at least one sealing lip is softer than at least one other sealing lip. Even though the material of the individual sealing lips can be different, it is preferred for them to be implemented of the same material and for the seal overall to be unitary. The softer sealing lip involves preferably the innermost sealing lip which, for this purpose, can be developed longer and/or thinner than at least one other sealing lip. This sealing lip can hereby be especially easily deformable and, according to the preferred shaping, ensure the sealing against moisture far in the interior of the filter housing. The at least one more rigid sealing lip is shorter and/or more compactly implemented such that it becomes deformed less significantly in the axial, and primarily in the radial, direction. Stated differently, such a sealing lip is typically compressed in its direction of extension and can consequently ensure the reliable sealing.

The cap preferably comprises at its outer margin a substantially U-shaped channel in which an opening edge can be received. The opening edge can hereby be clasped especially reliably and securely and the cap can support itself outside on the housing in particular by its outer shank. This can especially advantageously take place in cooperation with the subsequently described projections, ribs or other discrete effective areas. Through the U-shaped channel, i.e. a groove, the continuous securement of the seal can be ensured, simultaneously discrepancies in the geometry of the opening and/or of the cap can be compensated and the sealing function can be ensured.

Since for the reliable and secure sealing effect the described seal cooperates with the opening edge of the filter housing, the latter must be shaped for an enduring sealing function. It is preferred for this purpose that the filter housing in the proximity of the opening comprises at least one projection, such as, for example, a rib. Such projections or ribs ensure, for one, a mechanical reinforcement, however, they primarily define discrete, i.e. separate, effective areas on the outer opening edge of the housing at which the cap, in particular the outer shank of the groove or of the U-shaped channel, can be supported. It should be noted that the groove, or the U-shaped channel, in advantageous manner ensures the requisite space in order to provide the seal at the described site of the cap. The described effective areas, viewed in the direction of the opening, preferably are located on a rectangle or at least sectionally on a straight line such that the durable cooperation with the typically straight shank of the groove or of the U-shaped channel is enabled and deformations or shifts of the involved structural parts that may occur over the service life are sufficiently compensated.

As described, through the realization according to the invention separate securement means can be omitted such that it is preferred for any securement means for securing the cap on the filter housing to be integrated into the cap and in particular to be implemented integrally therewith. Such securement means can be, for example, clips that cooperate with suitable contours on the filter housing.

In addition to the above described filter housing for a motor vehicle, the invention also comprises a heating, ventilation and/or air-conditioning system for a motor vehicle.

BRIEF DESCRIPTION OF THE DRAWING

In the following a preferred embodiment example of the invention will be described with reference to the drawing. Therein show:

FIG. 3 the cap depicted in FIG. 2 in sectional view; and

FIG. 4 a segment of the cap depicted in FIGS. 2 and 3 after it has been applied.

DETAILED DESCRIPTION OF THE PREFERRED EMBODIMENTS OF THE INVENTION

Figure 1:
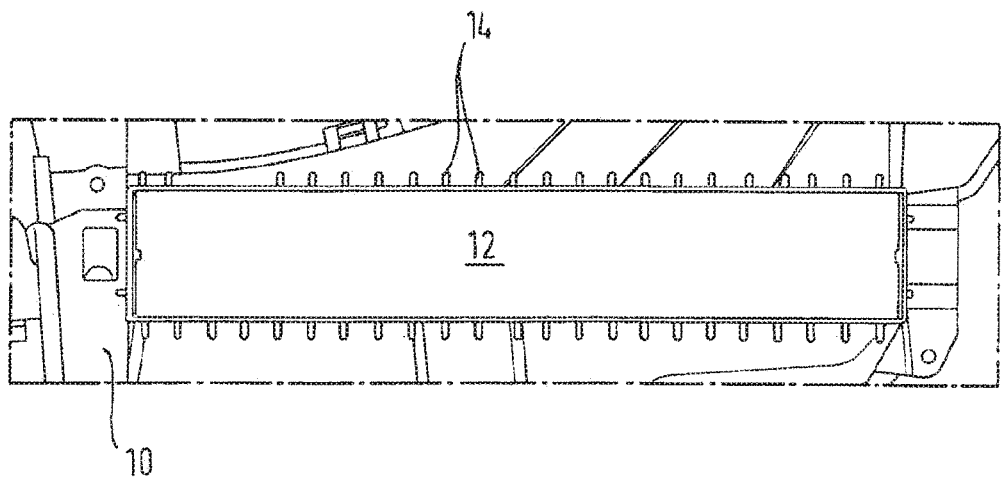
FIG. 1 an opening in a housing of an air-conditioning device.

In FIG. 1, first, an opening 12 of a partially shown filter housing 10 is shown that is substantially rectangular and, in the depicted case, comprises for the above described purpose numerous short ribs 14 on an opening edge, which edge, according to FIG. 1, extends in the direction of the viewer. They furthermore permit supporting the cap. The ribs 14 are preferably implemented perpendicularly to the opening edge.

Figure 2:
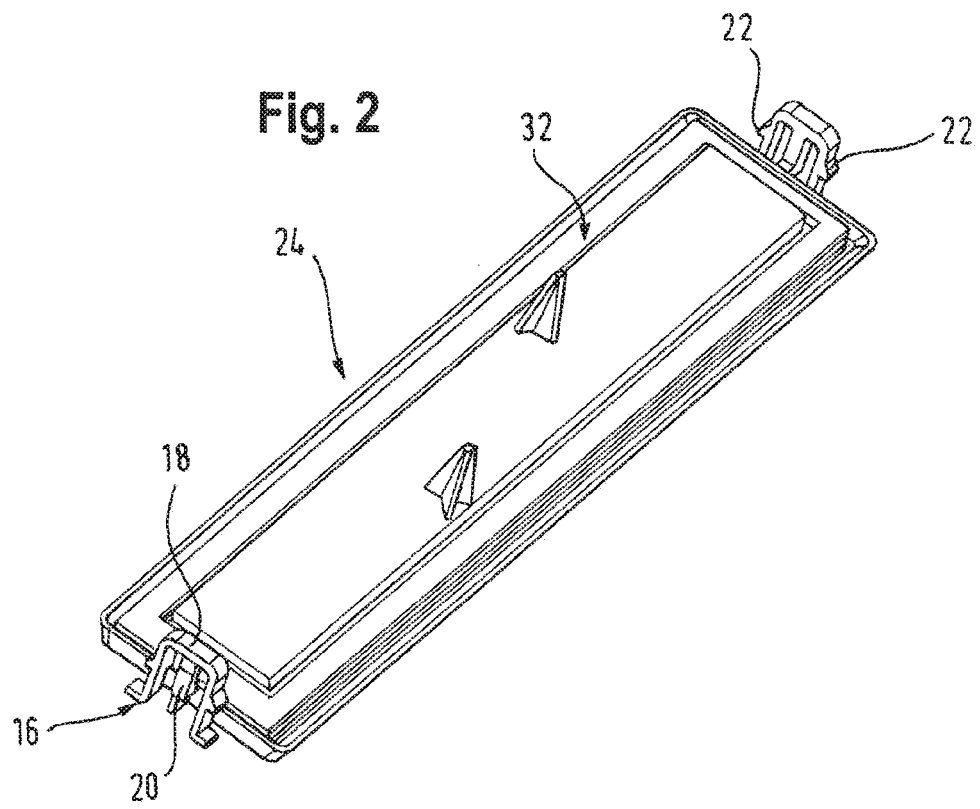
FIG. 2 a cap of a housing according to the invention in perspective view.

For closing the opening 12, the cap 24 shown in FIG. 2 is provided which has a corresponding rectangular shape and in the depicted case is provided at its short sides with integrated, unitary securement means 16. These comprise in the depicted case on each side a substantially inverted U-shaped clip 18, the shanks of both of which are movable, in particular movable with respect to one another. The connection to the cap proper takes place via a central web 20 and the "bottom" of the U-shaped clip. As can be seen particularly in the right-hand region of FIG. 2, each shank of the U comprises in its course a lug or projection 22, which, when applied, can engage behind a suitable contour on the filter housing. When applying the cap 24 the two shanks move toward one another in order to enable the particular projection 22 to move past the described contour. After this passage, the two shanks, due to their elasticity, move away from one another and the projections engage behind the described contours. To remove the cap, the two shanks are, for example manually, compressed such that the detachment of the cap is enabled.

As can already be seen in FIG. 2, in the interior of the cap 24 is a peripheral seal 32 which is secured to the interior of the cap and depicted in more detail in the additional Figures.

As is depicted in FIG. 3, the cap 24 comprises, for one, an outer peripheral, essentially U-shaped channel 26 in which is received (cf. FIG. 4) the opening edge 40 of the filter housing. The interior 28 of the cap 24 extends from the bottom 30 of the peripheral channel upwardly, in the depicted case over different steps such that a special rigidity is ensured. In contrast, the outermost margin 42 of the cap 24, in other words the outer shank of the U-shaped channel, extends in the direction in which does the cap 24 on the housing.

As can be seen in FIG. 4, an opening edge of the housing, with which the seal 32 cooperates, which can also be referred to as a spring or as a web cooperating with the groove or channel of the cap, extends substantially in the same direction. On the outer side in FIG. 4, further, one of the numerous ribs 14 can be seen on which the outermost margin 42 of the cap is supported. On the interior 28, also peripherally, as can already be seen in FIG. 2, a seal 32 is provided, whose, in the depicted case, three sealing lips extend substantially laterally or radially if the direction in which the cap 24 is attached on the filter housing (in FIG. 3 from bottom to top) is denoted as the axial direction. Regarding the material of the cap, with the exception of seal 32, it should be stated that it customarily is a polypropylene reinforced by minerals whereas the seal 32, in contrast, is implemented softer, for example of a thermoplastic elastomer.

As can be seen more accurately in FIG. 4, the seal 32 comprises in the depicted example three sealing lips 34, 36 and 38, which, from the inside toward the outside, become increasingly shorter and/or, through a more compact formation than the two outer sealing lips 36, 38, are more rigid than the innermost sealing lip 34 and, accordingly, are deformed largely in the radial direction (in FIG. 4 from left to right). In contrast, the innermost sealing lip 34, which is comparatively softer, can also become deformed in the axial direction (in FIG. 4 from top to bottom). The application of the cap on the filter housing such that the described sealing lips are durably and reliably in contact on the opening edge 40, shown in FIG. 4 on its inner side, is in any case enabled at low force expenditure. In the depicted case, further, the innermost, softer sealing lip 34 extends further in the direction of the opening edge 40 with which it cooperates than do the two other sealing lips 36, 38. An embodiment example is further shown in which the innermost and outermost sealing lips extend substantially in the radial direction, i.e. substantially perpendicularly to a direction in which the cap is applied on the housing, while the central sealing lip 36 extends obliquely into the interior of the filter housing.

The invention claimed is:

1. A housing for a motor vehicle comprising:
   a cap;
   wherein the housing has an opening therein, and
   wherein the cap comprises a seal on an inner side such that the seal is disposed within the housing when the cap caps the opening,
   wherein the cap comprises a U-shaped channel on its outer side, and an opening edge is received in the U-shaped channel.

2. A housing as in claim 1, wherein the seal is at least partially implemented of a thermoplastic elastomer.

3. A housing as in claim 2, wherein the seal is at least sectionally softer than the material of the cap.

4. A housing according to claim 1, wherein the seal comprises at least one sealing lip.

5. A housing as in claim 4, wherein at least one sealing lip is more readily deformable than at least one further sealing lip.

6. A housing as in claim 5, wherein the softer sealing lip is disposed furthest into the interior of the housing.

7. A housing according to claim 1, wherein the housing in the proximity of the opening comprises at least one projection.

8. A housing according to claim 1, wherein securement means for the securement of the cap on the housing are integrated in the cap.

9. A housing according to claim 1, wherein the housing is a filter housing, in which at least one filter is accessible through the opening.

10. A heating, ventilation and/or air-conditioning system for a motor vehicle with at least one housing according to claim 1.

11. A housing for a motor vehicle comprising:
   a cap;
   wherein the housing has an opening therein, wherein the cap comprises a seal on an inner side such that the seal is disposed within the housing when the cap caps the opening,
   wherein the seal comprises at least one sealing lip,
   wherein at least one sealing lip is more readily deformable than at least one further sealing lip, and
   wherein the softer sealing lip is disposed furthest into the interior of the housing.

* * * * *